(12) United States Patent
Ha

(10) Patent No.: US 9,545,886 B2
(45) Date of Patent: Jan. 17, 2017

(54) CARGO TRAY ASSEMBLY FOR A VEHICLE

(71) Applicant: GM GLOBAL TECHNOLOGY OPERATIONS LLC, Detroit, MI (US)

(72) Inventor: Wing Ha, Markham (CA)

(73) Assignee: GM Global Technology Operations LLC, Detroit, MI (US)

(*) Notice: Subject to any disclaimer, the term of this patent is extended or adjusted under 35 U.S.C. 154(b) by 72 days.

(21) Appl. No.: 14/136,558

(22) Filed: Dec. 20, 2013

(65) Prior Publication Data
US 2015/0175090 A1 Jun. 25, 2015

(51) Int. Cl.
*B60R 13/01* (2006.01)

(52) U.S. Cl.
CPC .......... *B60R 13/011* (2013.01); *B60R 13/013* (2013.01)

(58) Field of Classification Search
CPC ........ B60N 2/3011; B60R 5/04; B60R 13/011; B60R 13/013
USPC ............ 296/65.09, 193.07, 65.16, 37.16, 66
See application file for complete search history.

(56) References Cited

U.S. PATENT DOCUMENTS

| | | | | |
|---|---|---|---|---|
| 5,322,335 A | * | 6/1994 | Niemi | 296/97.23 |
| 5,716,091 A | * | 2/1998 | Wieczorek | 296/37.16 |
| 8,186,736 B2 | * | 5/2012 | Jouraku | 296/37.16 |
| 2013/0147226 A1 | * | 6/2013 | Cao | B60R 5/045 |
| | | | | 296/37.16 |

FOREIGN PATENT DOCUMENTS

| | | |
|---|---|---|
| CN | 1490200 A | 4/2004 |
| DE | 10012590 A1 | 9/2001 |
| DE | 202005007157 U1 | 7/2005 |

* cited by examiner

*Primary Examiner* — Joseph D Pape
*Assistant Examiner* — Dana Ivey
(74) *Attorney, Agent, or Firm* — Quinn Law Group, PLLC

(57) ABSTRACT

A cargo tray assembly for a vehicle includes first and second trays. The first tray has a translatable planar section in a first plane, and a first hinged section moveable between upright and flattened positions with respect to the first plane. The second tray has a fixed planar section arranged in a second plane that is parallel to the first plane. The fixed planar section connects to the interior, e.g., a wall of a rear cargo area, and the first hinged section connects to a seat in the interior. The translatable planar section translates in response to an applied force, such as when the seat is moved forward or aft. The first hinged section pivots about an axis orthogonal to the direction of translation, e.g., when the seat is stowed flat or deployed into an upright position. A vehicle having the assembly is also disclosed.

20 Claims, 4 Drawing Sheets

CARGO TRAY ASSEMBLY FOR A VEHICLE

TECHNICAL FIELD

The present disclosure relates to a cargo tray assembly for a vehicle.

BACKGROUND

Modern sport utility vehicles, crossover vehicles, pickup trucks, and the like typically provide a row of one or more seats adjacent to a rear cargo area. The rear seats may be configured as traditional bench-style seats, 50/50 or 60/40 split bench-style seats, or individual bucket seats. In some designs, the seats may be selectively adjusted to provide customized seat positioning and cargo area configuration. Possible seat adjustments may include seat fore/aft position, seat back recline angle, seat back fold flat for loading cargo on top of the seat back, etc.

In the rear cargo areas of the above described vehicles, mats or trays may be used to keep dirt, spills, and sharp edges from contacting the materials covering the cargo area floor and the seats. However, existing vehicle cargo tray designs have certain design limitations, and as a result, may not fully protect the vehicle interior. This is particularly true when conventional trays are used with certain types of adjustable seats.

SUMMARY

A cargo tray assembly is disclosed herein for use in a vehicle interior. In an example embodiment, the cargo tray assembly includes first and second trays. The first tray has a translatable planar section, i.e., a horizontal/flat section that is moveable both forward and aft with respect to a first axis, which is typically a longitudinal axis or centerline of the vehicle. The translatable planar section is arranged along a first plane. The first tray also includes a first hinged section. The first hinged section is connected to the translatable planar section, e.g., via a living hinge, and pivots between an upright/orthogonal position and a flattened/parallel position, with the orientation of each position being with respect to the first plane, e.g., to a second axis such as a lateral axis of the vehicle.

The second tray in this embodiment, which is connected to or otherwise positioned with respect to the first tray, has a fixed planar section that is arranged along a second plane. The second plane is parallel to the first plane. The fixed planar section is connectable to the vehicle interior, such as to the walls or a floor of a cargo area of the vehicle interior. The first hinged section may also be connectable to the vehicle interior, for instance to an adjustable seat located within the vehicle interior. The translatable planar section is configured to translate with respect to the fixed planar section, for instance in response to an applied force to the seat when a passenger slides the seat forward or aft within the vehicle interior. The first hinged section is configured to pivot about an axis that is orthogonal to the direction of translation, such as when the seat is folded flat for increased cargo capacity.

The first and/or the second tray may be thermoformed from a suitable thermoplastic material in a possible embodiment, e.g., polyurethane, or from metal, polypropylene, composite materials, or other suitable materials in other embodiments. The first hinged section may be connected to the translatable planar section, and the second hinged section may be connected to the fixed planar section, e.g., via a living hinge. In another embodiment, shaped wall sections, e.g., inverted arcuate or U-shaped wall sections, may be formed at one or more edges of the first and second trays. Such wall sections define a guide feature for translation of the translatable planar section. In yet another embodiment, fasteners such as hook-and-loop fasteners may connect the first hinged section to the back of the seat(s). Alternatively, the fasteners may be snap-fit fasteners or other fastener designs.

A vehicle is also disclosed herein having a body, an adjustable seat, and the cargo tray assembly noted above. The body defines the vehicle interior. In a possible embodiment, the translatable planar section is configured to translate with respect to the fixed planar section in response to a translation of the adjustable seat along a first axis, e.g., when a passenger slides the seat forward or aft in the vehicle interior. The first hinged section pivots in conjunction with the seat whenever the seat is rotated about a second axis that is orthogonally arranged with respect to the first axis, such as when the seat is folded flat for stowing and/or for loading cargo, or moved into an upright position to provide a seating surface.

The above features and advantages and other features and advantages of the present invention are readily apparent from the following detailed description of the best modes for carrying out the invention when taken in connection with the accompanying drawings.

DETAILED DESCRIPTION

Figure 1:
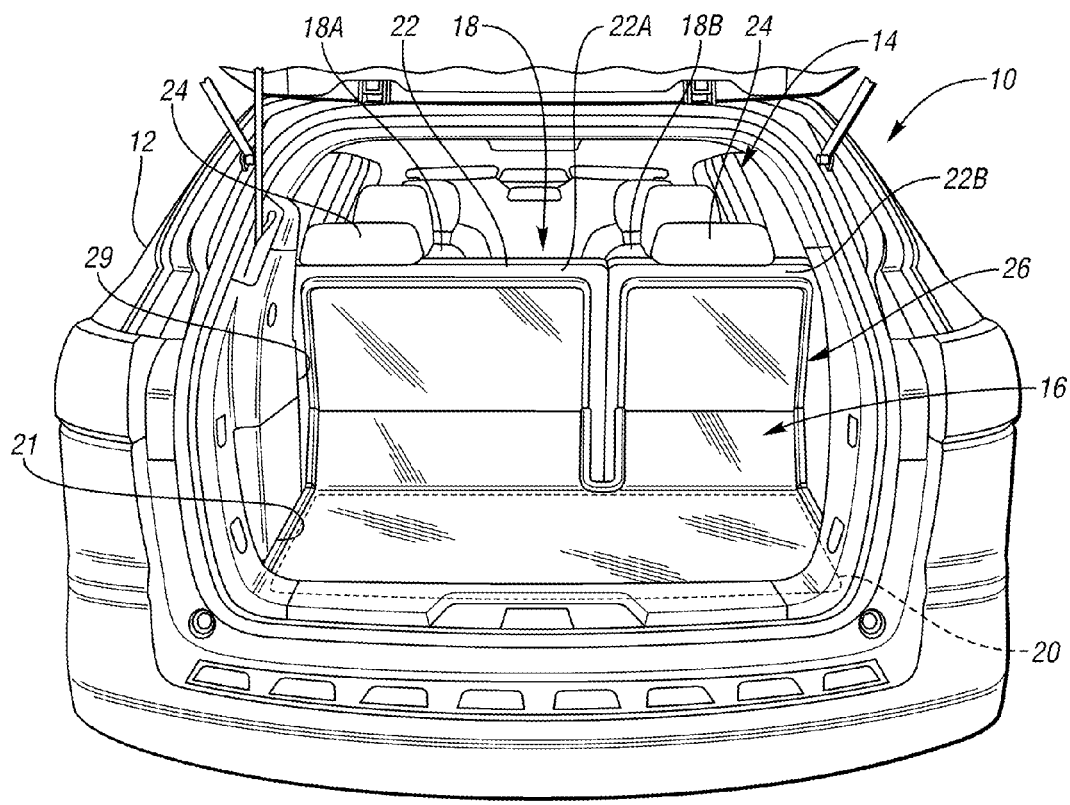
FIG. 1 is a schematic perspective rear view of an example vehicle interior with a cargo tray assembly in an upright position.

Referring to the drawings, wherein like reference numbers correspond to like or similar components throughout the several figures, and beginning with FIG. 1, an example vehicle 10 includes a cargo tray assembly 26 in accordance with the present disclosure. The cargo tray assembly 26 of the present invention is configured to translate and pivot in conjunction with an adjustable seat 18 through a range of possible seating positions, including translated forward/aft, positioned upright, reclined, and folded flat/stowed. As described in detail below with reference to FIGS. 2A-4B, in all of these possible adjustable seating positions, the cargo tray assembly 26 maintains contact with the seat 18 to optimize protection of the vehicle interior 14 from dirt, sharp edges, and the like.

The vehicle 10, which includes a vehicle body 12 defining the vehicle interior 14, may be configured as a sport utility vehicle as shown, but other designs such as crossover vehicles, pickup trucks, or the like may also be used with the cargo tray assembly 26 described herein. The vehicle interior 14, which includes a cargo area 16 having a floor 20, has an inner perimeter 21 surrounding the floor 20. The seat 18 is shown as a rear row of seats, i.e., a row that is positioned immediately adjacent to the cargo area 16. However, other designs may be contemplated which have the cargo area 16 adjacent to a different row of seats, e.g., a single front row of seats, and thus the positioning of the seat 18 can vary with the particular design of the vehicle 10. Also, as used herein, the term "adjustable" means at least translatable, i.e., slidably moveable along one axis, and may also include rotation/pivoting about a second axis that is orthogonal to the first axis. Example axes A and B are described below with reference to FIG. 1A.

The cargo tray assembly 26 of FIG. 1 is connectable to the vehicle interior 14, such as to a cargo area floor 20, to any of the walls or other structure defining the interior perimeter 21, and/or to the seat 18, so as to move in conjunction with the seat 18 in all possible seating positions. In this manner, the cargo area 16 remains fully covered by the cargo tray assembly 26 regardless of whether the seat 18 and the cargo tray assembly 26 are in an upright position as shown in FIGS. 3 and 3A or in a folded flat/flattened position as shown in FIGS. 2A, 2B, 4, and 4A.

Figure 1A:
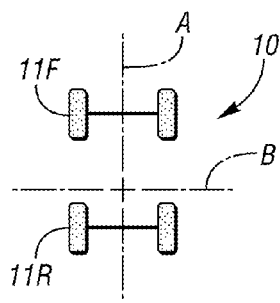
FIG. 1A is a schematic plan view illustration describing longitudinal and lateral axes of the vehicle of FIG. 1.

Referring briefly to FIG. 1A, the vehicle 10 has a centerline or longitudinal axis A that extends lengthwise from a set of front wheels 11F to a set of rear wheels 11R in a typical configuration in which a driver is seated in proximity to the front wheels 11F while passengers are seated behind the driver in closer proximity to the rear wheels 11R. Similarly, the vehicle 10 has a lateral axis B spanning the width of the vehicle 10, with the lateral axis B arranged orthogonally with respect to the longitudinal axis A. Thus, as used herein any motion described as "translatable" herein can occur along longitudinal axis A, or along another axis that is parallel to the longitudinal axis A, while any motion described as "pivotable" can occur with respect to lateral axis B, or with respect to another axis that is parallel to the lateral axis B.

Referring again to FIG. 1, the cargo area floor 20 is shown in phantom to indicate that the cargo area floor 20 is covered by the cargo tray assembly 26 once the cargo tray assembly 26 has been properly installed in the vehicle interior 14. The seat 18, which in a typical configuration would be positioned immediately adjacent to the cargo area 16 and attached to the body 12, can be selectively positioned in a plurality of selectable positions along the longitudinal axis A of FIG. 1A. The seat 18 in some embodiments may include a first seat 18A and a second seat 18B as shown, a single seat, or additional seats without departing from the intended inventive scope. That is, the seat 18 may be a bench, 50/50 split, 60/40 split, bucket, or any other seat configuration. The seats 18A, 18B may be positioned in a plurality of selectable positions along the longitudinal axis A of FIG. 1A, either together or individually. The cargo area tray 26 of the present invention is intended to function with any of these seat configurations.

The seat 18 of FIG. 1 also includes one or more seat backs 22, which may include a first seat back 22A and a second seat back 22B in the two-seat embodiment of FIG. 1. The seat backs 22A, 22B, which collectively have an outer perimeter 29, may be positioned in a plurality of selectable upright, reclined or flattened/folded flat positions relative to the lateral axis B of FIG. 1A, either together or individually. The seats backs 22A, 22B may include headrests 24 or other hardware without affecting the intended operation of the cargo tray assembly 26.

Figure 2A:
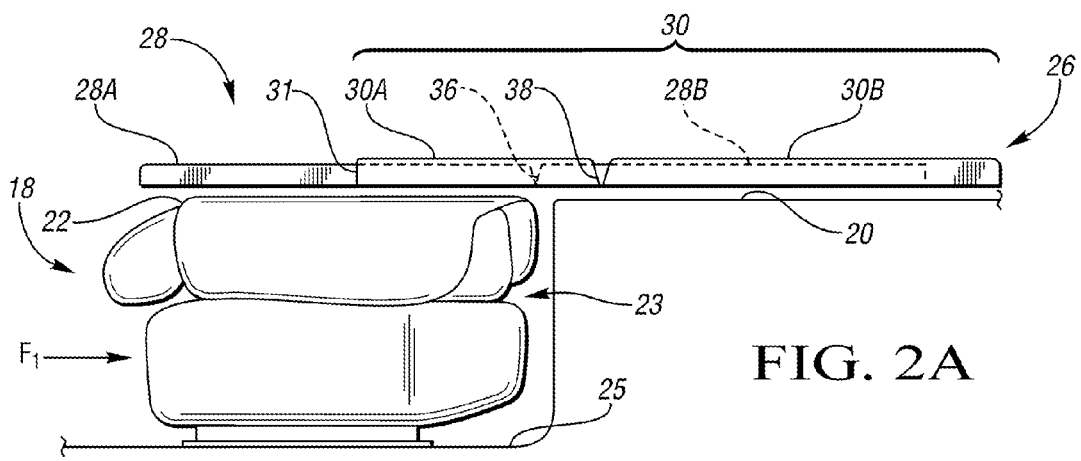
FIG. 2A is a schematic perspective side view illustration of part of the vehicle interior shown in FIG. 1, with the seat translated to a rear position and folded flat.
Figure 2B:
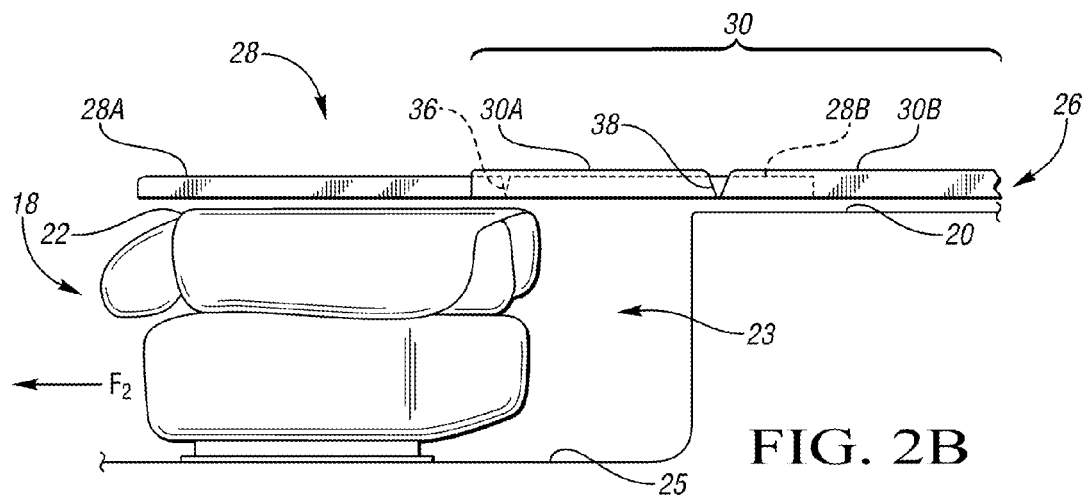
FIG. 2B is a schematic perspective side view illustration of the part of the vehicle interior shown in FIG. 2A, with the seat translated to a forward position and folded flat.
Figure 3:
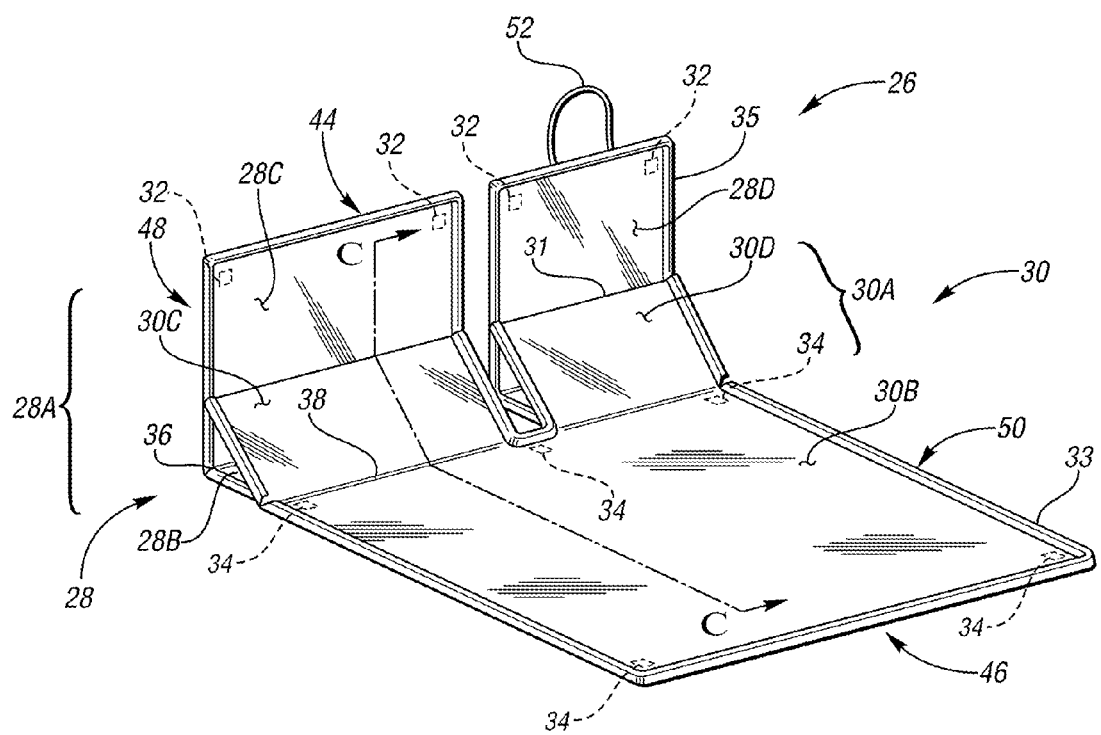
FIG. 3 is a schematic perspective view illustration of an example embodiment of the disclosed cargo tray assembly in an upright position.
Figure 3A:
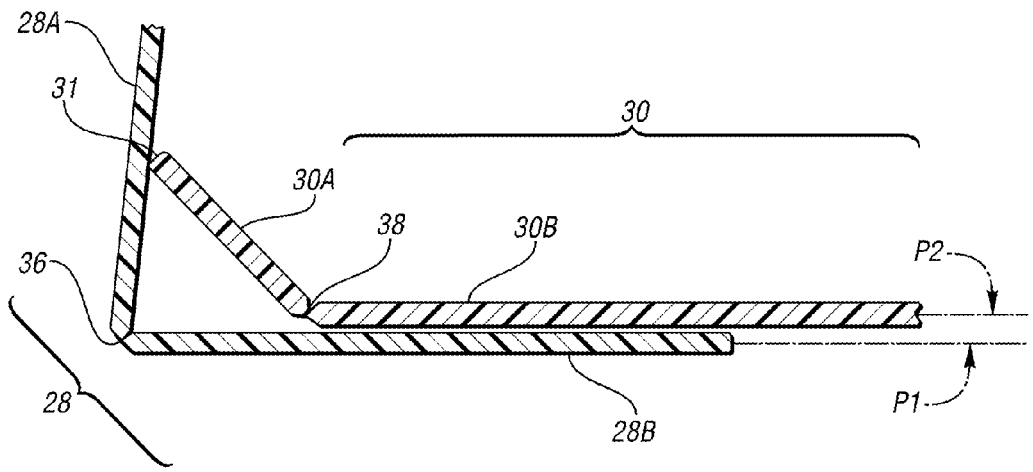
FIG. 3A is a partial schematic cross-sectional side view illustration of the cargo tray assembly of FIG. 3.

Referring to FIGS. 2A and 2B, the seat 18 and the attached cargo tray assembly 26 of FIG. 1 are shown in a flattened/folded flat position, with FIG. 2A depicting the seat 18 in a first (rearward) translated position and FIG. 2B depicting the seat 18 in a second (forward) translated position. The cargo tray assembly 26 includes a first tray 28 and second tray 30, with the second tray 30 positioned with respect to the first tray 28. The first tray 28 includes a first hinged section 28A and a translatable planar section 28B, with a hinge 36 or other connecting feature disposed therebetween to operatively connect the first hinged section 28A to the translatable planar section 28B. The hinge 36 may be embodied as a living hinge, i.e., constructed by forming a narrow area of material in the first tray 28, or it may be any other type of integral or separately attached hinge.

The second tray 30 has a fixed planar section 30B, and may also include a second hinged section 30A. When the second hinged section 30A is used, another hinge 38 or other connecting feature may be disposed between the second hinged section 30A and the fixed planar section 30B as shown. The hinge 38, as with the hinge 36, may be embodied as a living hinge as described above.

In all embodiments, the translatable planar section 28B is configured to translate with respect to the fixed planar section 30B, e.g., in response to an applied force. For instance, a force ($F_1$) of FIG. 2A may be used to slide or otherwise translate the seat 18 in one direction, while an opposite force ($F_2$) of FIG. 2B may be applied to translate the seat 18 in the other direction, with any translation of the seat 18 likewise translating the connected translatable planar section 28B. The first hinged section 28A is thus configured to pivot or rotate about the hinge 36 orthogonally to the direction of translation.

An intermediate area 23 of the vehicle interior 14 is located between the seat back 22 and the cargo area floor 20. The intermediate area 23 includes a cabin floor 25, which is generally parallel to the rear cargo area floor 20 but on a lower plane, i.e., a plane closer to the road surface (not shown) on which the vehicle 10 of FIG. 1 is travelling. The cargo tray assembly 26 of the present invention is thus intended to span, and thus fully cover, the cargo area floor 20, the cabin floor 25, and the seat backs 22 at all times. The cargo tray assembly 26 will now be described in further detail with reference to FIGS. 3 and 3A.

Figure 4:
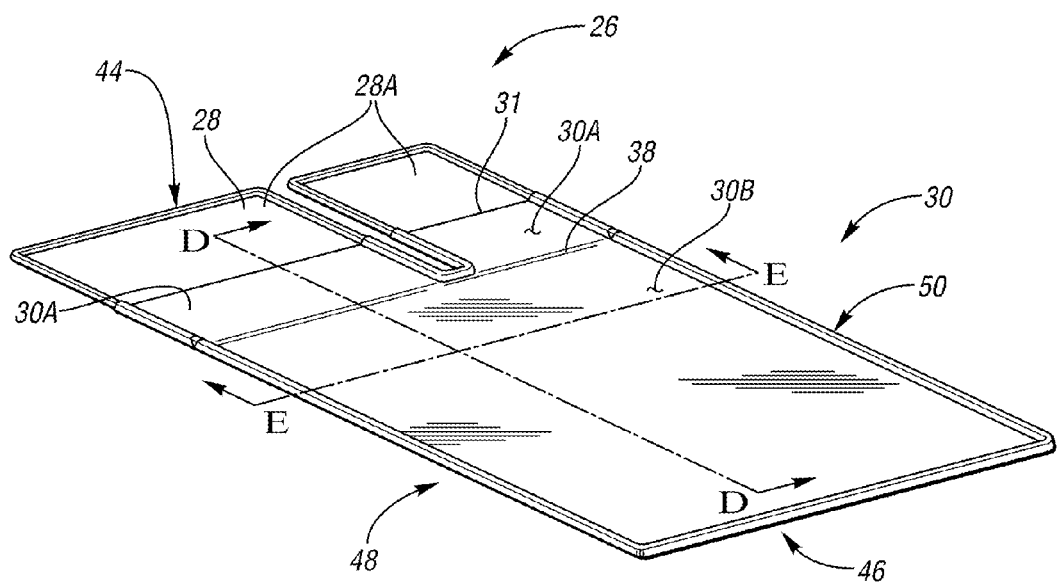
FIG. 4 is a schematic perspective view illustration of the cargo tray assembly of FIG. 3 in a folded flat/flattened position.
Figure 4A:
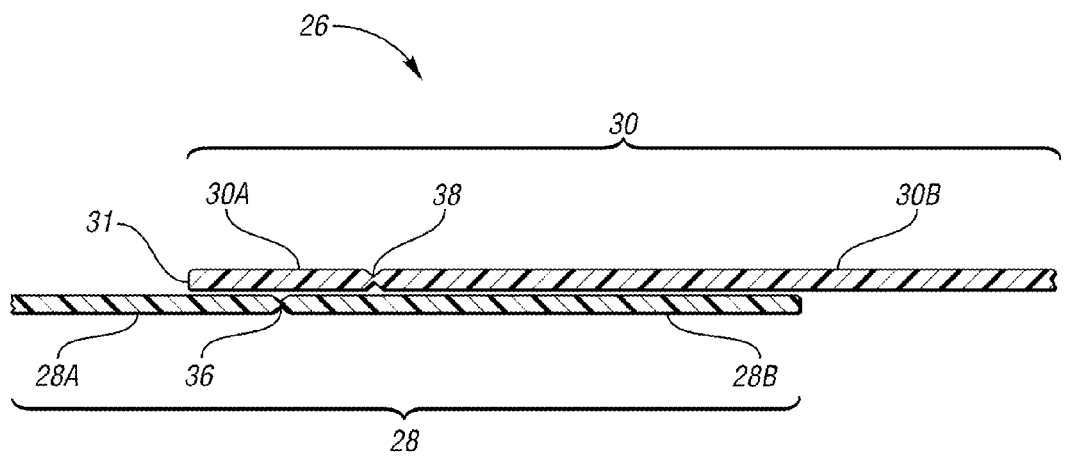
FIG. 4A is a partial schematic cross-sectional side view illustration of the cargo tray assembly of FIG. 4.

FIGS. 3 and 3A both depict the cargo tray assembly 26 as it appears in an upright position, with FIG. 3A showing side detail of the cargo tray assembly 26 of FIG. 3 taken at line C-C. FIGS. 4 and 4A show the same cargo tray assembly 26 of FIGS. 3 and 3A in a folded flat/flattened position. The description of FIG. 3 therefore applies to FIG. 4. Likewise, the description of FIG. 3A applies to FIG. 4A. For illustrative simplicity, therefore, the structure of the cargo tray assembly 26 will be described primarily with reference to FIGS. 3 and 3A.

The cargo tray assembly 26 of FIGS. 3 and 3A includes the respective first and second trays 28 and 30 as noted above. The cargo tray assembly 26 is bounded by a front edge 44, a rear edge 46, a left edge 48, and a right edge 50, with the terms "front", "rear", "left", and "right" referring to the typical positions with respect to a forward-facing passenger of the vehicle 10 of FIG. 1. The respective first and second trays 28 and 30 may be thermoformed of a suitable thermoplastic material, or formed of rubber, thermoset plastic, metal, or any other suitable material. The first tray 28 may include the first hinged section 28A noted above, which is configured to connect to the seat back 22 of FIGS. 2A and 2B, e.g., with one or more fasteners 32. The first hinged section 28A when used is moveable anywhere between an upright position (FIG. 3) and folded flat/flattened position (FIG. 4). The first tray 28 also includes the translatable planar section 28B, which may be attached to the first hinged section 28A via the hinge 36 as noted above.

The first hinged section 28A may be optionally split into a left first hinged section 28C and a right first hinged section 28D adjacent to the hinge 36, with "left" and "right" referring to the position of a forward-facing passenger within the vehicle interior 14 of FIG. 1. The first hinged section 28A may also include other first hinged sections. The respective left and right first hinged sections 28C and 28D may be configured to attach independently to each of the seat backs 22A, 22B of FIG. 1 to allow for independent translation of the seats 18A, 18B along the longitudinal axis A of FIG. 1A, and to allow for independent adjustment of the seat backs 22A, 22B relative to the lateral axis B of FIG. 1A.

The fasteners 32 of FIG. 3 may be easily unfastened to facilitate removal of the cargo tray assembly 26, or they may be configured as permanent fasteners. In one embodiment, the fasteners 32 may be hook-and-loop type fasteners. In another embodiment, the fasteners 32 may be a snap fit of an outer perimeter 35 of the first hinged sections 28C, 28D around the outer perimeter 29 (see FIG. 1) of the seat backs 22A, 22B of FIG. 1. In another embodiment, the fasteners 32 may be tabs (not shown) in the first hinged sections 28C, 28D that snap into slots (not shown) in the seat backs 22A, 22B of FIG. 1. In still another embodiment, the one or more fasteners 32 may include one or more straps 52, e.g., of elastic or other suitable material, that are attached to the first hinged sections 28C, 28D and looped around the headrests 24 of FIG. 1. Any other suitable fastening method may also be used.

The second tray 30 of FIG. 3 includes the fixed planar section 30B noted above. The fixed planar section 30B is stationary with respect to the cargo area floor 20 of FIGS. 2A and 2B and the translatable planar section 28B in all of the selectable positions of the seat 18 and the seat back 22 of FIG. 1. The fixed planar section 30B may be fastened to the vehicle interior 14, e.g., the cargo area floor 20, for instance by one or more additional fasteners 34. The additional fasteners 34 may be configured to be easily unfastened to facilitate removal of the cargo tray assembly 26, or they may be configured as permanent fasteners.

As an example, the additional fasteners 34 may be hook-and-loop type fasteners in an example embodiment. In another embodiment, the additional fasteners 34 may include a close fit between an outer perimeter 33 of the fixed planar section 30B and the inner perimeter 21 of the vehicle interior 14 (see FIG. 1). Alternatively, the additional fasteners 34 may include a snap fit of the outer perimeter 33 to the inner perimeter 21 of the interior 14 of FIG. 1. In still another embodiment, the additional fasteners 34 may include tabs (not shown) in the second tray fixed planar section 30B that snap fit into slots (not shown) in the cargo area floor 20 of FIGS. 2A and 2B. Any other suitable fastening method may also be used. Other embodiments may be envisioned for connecting the fixed planar section 30B to the vehicle interior 14 of FIG. 1, including for instance forming slots or grooves (not shown) in the vehicle interior 14 within which the fixed planar section 30B can be inserted.

As best shown in FIG. 3A, the translatable planar section 28B of the first tray 28 is arranged on a first plane (P1), while the fixed planar section 30B of the second tray 30 is arranged on a second plane (P2) that is parallel to the first plane (P1). FIGS. 4 and 4A are substantially identical to FIGS. 3 and 3A, but show respective FIGS. 3 and 3A in a folded flat/flattened seating position, i.e., when the seat backs 22A, 22B of FIG. 1 are in a folded flat or stowed position.

The second hinged section 30A of FIGS. 3 and 3A, which may be attached to the fixed planar section 30B by the hinge 38, has a leading edge 31. The second hinged section 30A may be used to maintain contact with the first hinged section 28A along the leading edge 31, and to rotate in conjunction with first hinged section 28A with respect to the lateral axis B of FIG. 1A whenever the seats 18 and the rear seat backs 22 of FIG. 1 pivot or rotate to selectively fold flat or deploy. Contact between the leading edge 31 of the second hinged section 30A and the first hinged section 28A may be maintained through both gravity and elastic spring forces resulting from the hinge 38 acting on the second hinged section 30A. These forces act to urge the leading edge 31 of the second hinged section 30A into contact with the first hinged section 28A. Other types of spring forces may also be employed to maintain contact between the leading edge 31 of the second hinged section 30A and the first hinged section 28A.

The second hinged section 30A of FIG. 3 may be optionally split into a left second hinged section 30C and a right second hinged section 30D adjacent to the hinge 38. The second hinged section 30A may also include other second hinged sections. The second hinged sections 30C, 30D are configured to maintain contact with the first hinged sections 28C, 28D along the leading edge 31, as well as to rotate in conjunction with first hinged sections 28C, 28D with respect to the lateral axis B of FIG. 1A when the seats 18A, 18B translate and the seat backs 22A, 22B of FIG. 1 pivot, as described above.

Figure 4B:
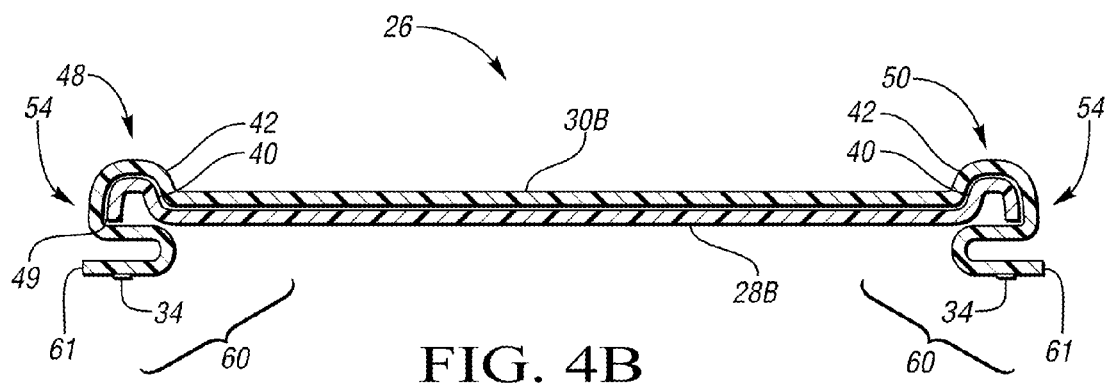
FIG. 4B is a schematic cross-sectional side view illustration of the cargo tray assembly of FIG. 4.

Referring to FIG. 4B, this Figure shows a cross-section of the cargo tray assembly 26 of FIG. 4 taken at line E-E of FIG. 4. To facilitate sliding translation of the translatable planar section 28B with respect to the fixed planar section 30B, the cargo tray assembly 26 may include a guide feature 54 that may be used to operatively connect the second tray 30 of FIG. 4A to the first tray 28. For example, wall sections 40, 42 may be suitably shaped, e.g., as inverted U-shaped walls as shown, arcuate walls, circular walls, etc., to provide parallel guide channels 49, such that the translatable planar section 28B can slide back and forth within the guide channels 49. Comparable guide features 54 may be envisioned such as slots, rails, grooves, or the like, whether singular or plural, and whether formed in the first and/or second trays 28, 30 of FIG. 4A or in the structure of the vehicle interior 14 of FIG. 1.

Such wall sections 40, 42 may be optionally formed on some or all of the edges 44, 46, 48, 50 of the respective first and second trays 28 and 30, with edges 44 and 46 shown in FIG. 3. Other walls, similar to the inverted U-shaped or arcuate wall sections shown, may be formed on other edges of the first and second trays 28, 30, including the edges between the first hinged sections 28C, 28D and the second hinged sections 30C, 30D of FIG. 3. The example wall sections 40, 42 of FIG. 4B may be formed by thermoforming, molding, or any other suitable forming process.

To facilitate installation of the cargo tray assembly 26 to the vehicle interior 14 of FIG. 1, the fixed section 30B may also include optional mounting feet 60, e.g., arcuate or U-shaped shaped feet opening away from the longitudinal axis A of FIG. 1A as shown. Some of the additional fasteners 34 may be attached to the feet 60 as shown, or the feet 60 may be snapped into or received within a channel (not shown) defined in the cargo area floor 20 of FIG. 1. Other approaches to securing the cargo tray assembly 26 to the vehicle interior 14 of FIG. 1 may be envisioned without departing from the intended inventive scope, e.g., extending ends 61 of the feet 60 to provide a radial tab which can be received in mating slots (not shown) in the vehicle interior 14, or dispensing with the feet 60 and instead extending the wall section 42 such that the wall section 42 serves the same purpose, e.g., by being received into mating slots (not shown) in the vehicle interior 14.

The cargo tray assembly 26 as described above may have various other embodiments without departing from the intended inventive scope. For example, relative positioning of the first and second trays 28 and 30, respectively, can be reversed such that that second tray 30 lies below the first tray 28 with respect to the typical orientation of the vehicle interior 14. That is, as shown in FIG. 4A, the second tray 30 remains fixed above the first tray 28. This may be reversed without changing the resultant benefits. In an alternative embodiment, the second hinged section 30A and the hinge 38 may be eliminated, such that the second hinged section 30A effectively becomes an extension of the fixed planar section 30B. Likewise, other connection mechanisms may be envisioned for allowing the first tray 28 to translate with respect to the second tray 30. While the design of FIG. 4B is one possible example, others may include devices such as rollers, wheels, tongue-and-groove, and the like. Thus, the example embodiments set forth above are not intended to be limiting, but rather are examples of suitable configurations.

While the best modes for carrying out the invention have been described in detail, those familiar with the art to which this invention relates will recognize various alternative designs and embodiments for practicing the invention within the scope of the appended claims.

The invention claimed is:

1. A cargo tray assembly for a vehicle interior including a rear cargo area and having a floor, the cargo tray assembly comprising:
   a first tray having a translatable planar section arranged along a first plane, and a first hinged section that is connected to the translatable planar section and configured to attach to an adjustable seat of the vehicle interior; and
   a second tray that includes a fixed planar section arranged along a second plane that is parallel to the first plane and configured to attach to the vehicle interior;
   wherein the translatable planar section is configured to translate with respect to a first axis along the first plane, and wherein the first hinged section is configured to pivot about a second axis that is orthogonal to the first axis.

2. The cargo tray assembly of claim 1, further comprising a guide feature, wherein the second tray is operatively connected to the first tray via the guide feature.

3. The cargo tray assembly of claim 2, wherein the guide feature includes parallel guide channels.

4. The cargo tray assembly of claim 1, wherein the second tray includes a second hinged section that is connected to the first planar section, and wherein the second hinged section pivots in conjunction with the first hinged section.

5. The cargo tray assembly of claim 4, wherein the second hinged section is connected to the fixed planar section via a living hinge.

6. The cargo tray assembly of claim 1, wherein the first and second trays are constructed from a thermoplastic material.

7. The cargo tray assembly of claim 1, further comprising a living hinge, wherein the first hinged section is connected to the translatable planar section via the living hinge.

8. The cargo tray assembly of claim 1, wherein each of the first and second trays defines corresponding edges each having an inverted arcuate or U-shaped shaped wall section which collectively define a guide feature for the translatable planar section.

9. A vehicle comprising:
   a body defining a vehicle interior including a rear cargo area and having a floor;
   an adjustable seat connected to the body, wherein the seat is operable to translate along a first axis, and also to pivot about a second axis that is orthogonal to the first axis to thereby adjust the seat between an upright position and a flat position; and
   a cargo tray assembly having:
      a first tray having a translatable planar section arranged along a first plane, and further having a first hinged section that is connected to the seat and to the translatable planar section; and
      a second tray that includes a fixed planar section connected to the vehicle interior and arranged along a second plane that is parallel to the first plane;
      wherein the translatable planar section is configured to translate with respect to a first axis along the first plane, and wherein the first hinged section is configured to pivot about a second axis that is orthogonal to the first axis.

10. The vehicle of claim 9, wherein the vehicle interior includes a cargo area having a cargo area floor, and wherein the second tray further includes a second hinged section that engages the first hinged section such that the second hinged section pivots in conjunction with the first hinged section.

11. The vehicle of claim 9, further comprising a guide feature, wherein the second tray is operatively connected to the first tray via the guide feature.

12. The vehicle of claim 11, wherein the guide feature includes a pair of parallel guide channels.

13. The vehicle of claim 9, wherein the first and second trays are constructed from a thermoplastic material.

14. The vehicle of claim 9, wherein the first hinged section is connected to the translatable planar section via a living hinge.

15. The vehicle of claim 9, wherein the second tray includes a second hinged section engaged with the first hinged section such that the second hinged section pivots in conjunction with the first hinged section.

16. The vehicle of claim 15, wherein the second hinged section is connected to the fixed planar section via a living hinge.

17. The vehicle of claim 9, wherein each of the first and second trays defines edges each having a shaped wall section, and wherein the shaped wall sections define a guide channel for the translatable planar section.

18. The vehicle of claim 9, further comprising a plurality of fasteners, wherein a first set of the fasteners connects the fixed planar section to the cargo area floor, and a second set of the fasteners connects the first hinged section to the seat.

19. A cargo tray assembly for use in a vehicle interior defining a cargo area having a cargo area floor and containing an adjustable seat, the cargo tray assembly comprising:
- a first thermoformed tray having a translatable planar section arranged along a first plane, a first living hinge, and a first hinged section connected to the translatable planar section via the first living hinge, wherein the first hinged section is connected to the adjustable seat via a first set of fasteners;
- a second thermoformed tray that is operatively connected to the first thermoformed tray, and having:
  - a fixed planar section connected to the cargo area floor and arranged along a second plane that is parallel to the first plane;
  - a second living hinge; and
  - a second hinged section that is connected to the fixed section via the second living hinge, wherein the fixed planar section remains stationary with respect to the cargo area floor, and wherein the second hinged section pivots in conjunction with the first hinged section;
- wherein the translatable planar section is configured to selectively translate with respect to a first axis along the first plane, and wherein the first hinged section is configured to pivot about a second axis that is arranged orthogonally with respect to the first axis.

20. The cargo tray assembly of claim 19, wherein each of the first and second thermoformed trays defines a corresponding edge having an inverted arcuate or U-shaped wall section forming parallel guide channels for the translatable planar section.

* * * * *